(12) United States Patent
Benkreira et al.

(10) Patent No.: US 10,798,089 B1
(45) Date of Patent: Oct. 6, 2020

(54) SYSTEM AND METHOD FOR CAPTURING INFORMATION

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/437,875

(22) Filed: Jun. 11, 2019

(51) Int. Cl.
*H04L 29/06* (2006.01)
*G06F 16/958* (2019.01)
*G06F 16/955* (2019.01)

(52) U.S. Cl.
CPC ........ *H04L 63/0823* (2013.01); *G06F 16/955* (2019.01); *G06F 16/986* (2019.01); *H04L 63/0428* (2013.01); *H04L 63/08* (2013.01); *H04L 63/166* (2013.01)

(58) Field of Classification Search
CPC . H04L 63/08; H04L 63/0428; H04L 63/0823; H04L 63/166
See application file for complete search history.

(56) References Cited

U.S. PATENT DOCUMENTS

| | | | | |
|---|---|---|---|---|
| 7,325,188 B1 * | 1/2008 | Covington | ............ | G06F 16/958 715/234 |
| 8,200,962 B1 * | 6/2012 | Boodman | ................ | G06F 21/53 713/161 |
| 8,549,099 B2 * | 10/2013 | Sebastian | ................ | H04L 67/02 709/217 |
| 9,558,288 B1 * | 1/2017 | Boswell | ................ | G06F 16/958 |
| 9,772,986 B2 * | 9/2017 | Zhang | ........................ | A47L 5/30 |
| 9,785,627 B2 * | 10/2017 | Campanelli | ........... | G06F 17/243 |
| 10,013,411 B2 * | 7/2018 | Sherry | .................. | G06F 40/174 |
| 10,133,718 B2 * | 11/2018 | Iasi | ........................ | G06F 17/243 |
| 10,140,277 B2 * | 11/2018 | Unsal | .................... | G06F 17/243 |
| 10,254,929 B2 * | 4/2019 | Beveridge | ............. | G06F 3/0484 |
| 10,339,199 B2 * | 7/2019 | Pancharathi | .......... | G06F 40/117 |
| 2005/0210263 A1 * | 9/2005 | Levas | .................... | H04L 9/3271 713/182 |
| 2005/0216452 A1 * | 9/2005 | Teague | ................ | G06F 16/9562 |
| 2006/0279772 A1 | 12/2006 | Ludwig et al. | | |
| 2009/0119602 A1 * | 5/2009 | Nishiyama | .............. | G06F 21/31 715/753 |

(Continued)

OTHER PUBLICATIONS

Lee, Danico, and Costas Tsatsoulis. "Intelligent data entry assistant for xml using ensemble learning." Proceedings of the 10th international conference on Intelligent user interfaces. 2005. pp. 83-89. (Year: 2005).*

(Continued)

*Primary Examiner* — Kari L Schmidt
(74) *Attorney, Agent, or Firm* — DLA Piper LLP (US)

(57) ABSTRACT

Embodiments of the present disclosure relate to systems and methods for capturing information. In addition, embodiments of the present disclosure relate to solutions for capturing information using a web browser extension. Embodiments of the present disclosure further relate to securely transmitting captured information to a server for association with an application or form being completed by an individual.

16 Claims, 7 Drawing Sheets

(56) References Cited

U.S. PATENT DOCUMENTS

| | | | | |
|---|---|---|---|---|
| 2011/0142344 A1* | 6/2011 | Fukushima | ........ | G06K 9/00979 382/182 |
| 2012/0010995 A1* | 1/2012 | Skirpa | .................. | G06F 3/0481 705/14.49 |
| 2012/0323704 A1* | 12/2012 | Steelberg | ............... | G06Q 30/02 705/14.73 |
| 2013/0159274 A1* | 6/2013 | Silberstein | .............. | H04L 67/20 707/706 |
| 2013/0179244 A1 | 7/2013 | Laffoon et al. | | |
| 2013/0282808 A1* | 10/2013 | Sadanandan | ........... | G06Q 10/10 709/204 |
| 2013/0297645 A1* | 11/2013 | Foresti | ................ | G06F 16/2455 707/769 |
| 2014/0053061 A1* | 2/2014 | Chasen | ................ | G06F 3/0485 715/234 |
| 2014/0067474 A1* | 3/2014 | Deo | ................... | G06Q 30/0203 705/7.32 |
| 2014/0122988 A1* | 5/2014 | Eigner | .................... | H04L 67/30 715/226 |
| 2014/0129920 A1* | 5/2014 | Sheretov | ................ | G06F 40/14 715/234 |
| 2014/0157104 A1* | 6/2014 | Carlsen | ................ | G06F 40/154 715/234 |
| 2014/0236716 A1* | 8/2014 | Shapiro | .................. | G06Q 50/01 705/14.53 |
| 2014/0359415 A1* | 12/2014 | Song | .................... | G06F 16/958 715/206 |
| 2014/0380142 A1* | 12/2014 | Mikutel | .................. | G06F 9/451 715/234 |
| 2015/0046779 A1* | 2/2015 | Akselrod | ................ | G06F 40/14 715/202 |
| 2016/0253303 A1* | 9/2016 | Pennington | ........... | G06F 17/243 715/226 |
| 2017/0011441 A1* | 1/2017 | Buezas | .............. | G06Q 30/0635 |
| 2017/0289267 A1* | 10/2017 | Eschbach | .............. | H04L 67/142 |
| 2017/0364949 A1* | 12/2017 | Vandusen | .......... | G06Q 30/0255 |
| 2018/0005276 A1* | 1/2018 | John | ................... | G06Q 30/0269 |
| 2018/0089158 A1* | 3/2018 | Mehta | ................... | G06F 3/0237 |
| 2020/0073903 A1* | 3/2020 | Jain | ..................... | G06F 16/9558 |

OTHER PUBLICATIONS

Ming-Jui Huang and Tzao-Lin Lee, "An integrated software processor with autofilling out web forms," 2008 13th Asia-Pacific Computer Systems Architecture Conference, Hsinchu, 2008, pp. 1-8. (Year: 2008).*

T. Chusho, K. Fujiwara and K. Minamitani, "Automatic filling in a form by an agent for web applications," Ninth Asia-Pacific Software Engineering Conference, 2002., Gold Coast, Queensland, Australia, 2002, pp. 239-247. (Year: 2002).*

Oh, JinSeok, et al. "Migration of web applications with seamless execution." Proceedings of the 11th ACM SIGPLAN/SIGOPS International Conference on Virtual Execution Environments. 2015. pp. 173-185. (Year: 2015).*

* cited by examiner

FIG. 6

Loan Application for John Smith

| | |
|---|---|
| Credit Score | 743 |
| Credit Cards | 3 |
| Loans | 2 |
| Checking account balance | $52,621.54 |
| Savings account balance | |
| Investment balance | |

600

610

SYSTEM AND METHOD FOR CAPTURING INFORMATION

BACKGROUND

The process of filling out documents, such as a loan application or tax form, can be complex and can require the individuals completing the forms to compile several sensitive documents for presentation to an institution. The documents can come from a variety of sources, such as banks, financial institutions, financial advisors, payroll organizations, or tax planning businesses. Before the Internet, individuals commonly needed to visit physical locations tied to institutions to obtain hard copies of the required documents or had to wait to receive them by mail. The individual would then compile the physical copies of all the necessary documents and present them to an institution, such as a bank where they were seeking to obtain a loan. This process was time-consuming and insecure. The individual risked losing sensitive documents in the process of obtaining all of the necessary documents. The institution was also at risk in that the documents could be forged or edited.

With the advent of the Internet, the process for gathering documents for presentation to an institution, such as a bank as part of a loan application, has improved. Banks and other financial institutions now offer online services that provide important financial documents, such as tax forms and bank statements. Individuals can now obtain the necessary documents by visiting websites to obtain the necessary documents. However, this process is still inefficient. Individuals still need to download and gather all of the required documents for presentation to the institution. The institution is also still at risk that the documents could be forged or edited, such as through use of document or image editing software.

SUMMARY

Embodiments of the present disclosure relate to systems and methods for capturing information. In addition, embodiments of the present disclosure relate to solutions for capturing information using a web browser extension. Embodiments of the present disclosure further relate to securely transmitting captured information to a server for association with an application or form being completed by an individual.

In accordance with some embodiments of the present disclosure, there is provided a computer-implemented method for capturing webpage information. The method includes executing, by a client device including a processor, a web browser application and instructions for a web browser extension for the web browser application. The method also includes receiving, by the client device, a credential for associating a user with a profile stored on the server. The method further includes providing, by the client device, a webpage for display to the user using the web browser application. The method still further includes receiving, by the client device, an indication that the user has made a selection using the web browser extension while the webpage is displayed to the user. The method also includes capturing, by the client device, information from the webpage based on the indication. The method further includes sending, by the client device, the captured information to a server over a network for storage in association with the profile.

In accordance with aspects of the disclosure, the method further includes providing, by the client device, a second webpage for display to the user using the web browser application. The method also includes receiving, by the client device, a second indication that the user has made a selection using the web browser extension while the second webpage is displayed to the user. The method further includes capturing, by the client device, information from the second webpage based on the second indication. The method still further includes sending, by the client device, the captured information from the second webpage to the server over the network for storage in association with the profile.

In accordance with further aspects of the disclosure, the captured information includes a hypertext markup language (HTML) document from the webpage.

In accordance with still further aspects of the disclosure, the method further includes sending, by the client device to the server over the network, a universal resource location (URL) of the webpage from which the information was captured.

In accordance with aspects of the disclosure, the method further includes verifying that a secure sockets layer (SSL) certificate or a transport layer security (TLS) certificate for the webpage is valid.

In accordance with further aspects of the disclosure, the method further includes sending, by the client device, the captured information from the webpage to the server over the network in an encrypted form.

In accordance with still further aspects of the disclosure, the method further includes receiving, by the client device, input from the user identifying a type of the information provided on the webpage. The method still further includes sending, by the client device over the network to the server, information regarding the type of the information provided on the webpage based on the user input.

Furthermore, in accordance with some embodiments, there is provided a server system for capturing webpage information, including a memory storing instructions and one or more processors that execute the instructions. The one or more processors, when executing the instructions, are configured to receive, over a network, an indication from a web browser executing on a client device that a user desires to complete an online application. The one or more processors, when executing the instructions, are further configured to provide, over the network to the client device, an address for downloading a web browser extension in response to the indication. The one or more processors, when executing the instructions are still further configured to receive, over the network, information captured from a webpage by the client device using the web browser extension. The one or more processors, when executing the instructions, are also configured to complete the online application based at least in part on the received information captured from the webpage.

In accordance with further aspects of the disclosure, the webpage is a first webpage, and the one or more processors are further configured to receive, over the network, information captured from a second webpage by the client device using the web browser extension. The one or more processors are still further configured to complete the online application based at least in part on the received information captured from the first webpage and the received information captured from the second webpage.

In accordance with still further aspects of the disclosure, the one or more processors are further configured to store the received information captured from the first webpage and the received information captured from the second webpage in association with a profile for the user.

In accordance with aspects of the disclosure, the one or more processors are further configured to parse information relevant to the online application from the information captured from the webpage. The one or more processors are further configured to complete the online application based at least in part on the information relevant to the online application.

In accordance with further aspects of the disclosure, the information captured from the webpage includes a hypertext markup language (HTML) document.

In accordance with still further aspects of the disclosure, the one or more processors are further configured to parse the information captured from the webpage to identify one or more tags and attributes associated with the one or more tags. The one or more processors are still further configured to compare the one or more tags with a list of stored tags. The one or more processors are also configured to identify one of the tags and its associated attributes as being relevant to the online application as a result of the comparison.

In accordance with aspects of the disclosure, the one or more processors are further configured to receive, over the network from the client device, a universal resource locator (URL) associated with the webpage. The one or more processors are still further configured to identify the list of stored tags based on the received URL.

In accordance with further aspects of the disclosure, the identified tag and its associated attributes indicates one of an income, a bank account balance, credit information, an investment fund balance, or a loan balance associated with the user.

In accordance with aspects of the disclosure, the webpage includes one of a pay stub, a W-2 form, a bank statement, an investment fund statement, a credit statement, or a loan statement associated with the user.

Further still, in accordance with some embodiments, there is provided a client device for capturing webpage information, including a memory storing instructions and a processor that executes the instructions. The processor, when executing the instructions, is configured to execute a web browser application, and receive a selection indicating that a user desires to complete an online application. The processor, when executing the instructions, is further configured to execute instructions for web browser extension for the web browser application in response to the received selection, and to provide a webpage for display to the user using the web browser application. The processor, when executing the instructions, is still further configured to receive an indication that the user has made a selection using the web browser extension while the webpage is displayed to the user. The processor, when executing the instructions, is also configured to capture information from the webpage based on the indication, and to send the captured information to a server over a network for storage in association with a profile associated with the user for the online application.

In accordance with aspects of the disclosure, the webpage is a first webpage, the indication is a first indication, and the processor is further configured to provide a second webpage for display to the user using the web browser application. The processor is still further configured to receive a second indication that the user has made a selection using the web browser extension while the second webpage is displayed to the user. The processor is also configured to capture information from the second webpage based on the second indication, and to send the captured information from the second webpage over the network for storage in associated with the profile associated with the user.

In accordance with further aspects of the disclosure, the processor is further configured to receive a message from the server over the network indicating that the online application has been completed in response to sending the captured information to the server.

In accordance with still further aspects of the disclosure, the information captured from the webpage is an image file of a screen shot of at least a portion of the webpage.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

FIG. 6 illustrates an example view of an application to be completed at least in part with captured information, consistent with embodiments of the present disclosure.

DETAILED DESCRIPTION

Figure 1:
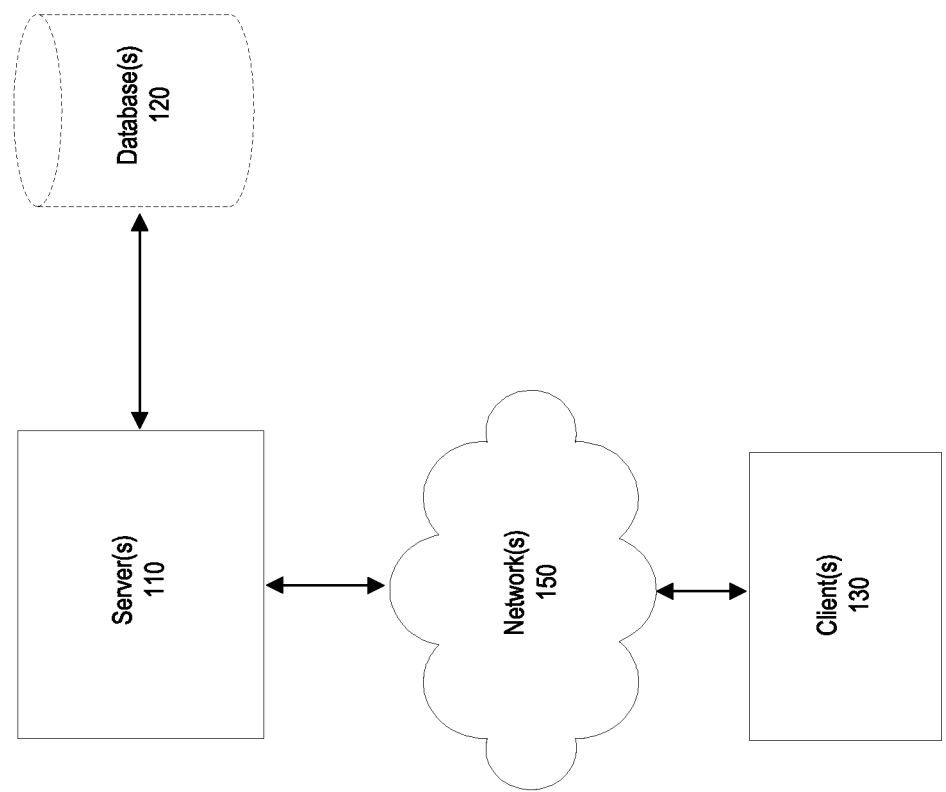
FIG. 1 illustrates an example view of a network environment for capturing information, consistent with embodiments of the present disclosure.

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments of the present disclosure relate to systems and methods for capturing information. In addition, embodiments of the present disclosure relate to solutions for capturing information using a web browser extension. Embodiments of the present disclosure further relate to securely transmitting captured information to a server for association with an application or form being completed by an individual.

The process of filling out documents, such as a loan application or tax form, can be complex and can require the individuals completing the forms to compile several sensitive documents for presentation to an institution. The documents can come from a variety of sources, such as banks, financial institutions, financial advisors, payroll organizations, or tax planning businesses. Before the Internet, individuals commonly needed to visit physical locations tied to institutions to obtain hard copies of the required documents, or had to wait to receive them by mail. The individual would then compile the physical copies of all the necessary documents and present them to an institution, such as a bank where they were seeking to obtain a loan. This process was time-consuming and insecure. The individual risked losing sensitive documents in the process of obtaining all of the necessary documents. The institution was also at risk in that the documents could be forged or edited.

With the advent of the Internet, the process for gathering documents for presentation to an institution, such as a bank as part of a loan application, has improved. Banks and other financial institutions now offer online services that provide important financial documents, such as tax forms and bank statements. Individuals can now obtain the necessary documents by visiting websites to obtain the necessary documents. However, this process is still inefficient. Individuals still need to download and gather all of the required documents for presentation to the institution. The institution is also still at risk that the documents could be forged or edited, such as through use of document or image editing software.

Embodiments of the present disclosure can improve the experience of gathering documents, such as sensitive financial documents, to provide to an institution, such as a bank as part of a loan application. Embodiments of the present disclosure can also reduce the risk to the institution that the documents the institution is receiving are forged or fraudulent in some way.

Some embodiments of the present disclosure provide systems and methods for capturing information, such as webpage information, images, and/or documents, through use of a web browser extension. In some embodiments, the web browser extension captures information, such as the universal resource locator (URL) and files (e.g., hypertext markup language (HTML)) associated with the webpage. In some embodiments, the web browser extension determines and verifies the identity of a webpage. In some embodiments, the web browser extension can cause the captured information to be transmitted to a server for use in completing an application or form associated with an institution. Thus, systems and methods of the present disclosure may simplify the process of gathering information needed to complete an application or form. Systems and methods of the present disclosure may also reduce the risk to the institution that the documents are forged or fraudulent, because the information directly captured from a web browser may be less amenable to editing than hard copies of documents or electronic files such as image files stored on a computer.

FIG. 1 illustrates a block diagram of an example computing environment 100 for implementing embodiments and features of the present disclosure. The arrangement and number of components in environment 100 is provided for purposes of illustration. Additional arrangements, number of components, and other modifications can be made, consistent with embodiments of the present disclosure.

Computing environment 100 includes one or more client devices 130, connected to one or more servers 110 over one or more networks 150. Server(s) 110 may include one or more databases 120, or may be connected to one or more databases over one or more networks.

In some embodiments, a client device, such as client device 130, can be a mobile phone, smart phone, tablet, netbook, electronic reader, personal digital assistant (PDA), personal computer, laptop computer, smart watch, gaming device, desktop computer, set-top box, smart television, personal organizer, portable electronic device, smart appliance, navigation device, and/or other types of computing devices. In some embodiments, a client device may be implemented with hardware devices and/or software applications running thereon. A user may use a client device to communicate with server(s) 110 or one or more other client devices over network(s) 150. A client device may communicate by transmitting data to and/or receiving data from server(s) 110 or other client devices. In some embodiments, one or more client devices, such as client device 130, may be implemented using a computer system, such as computing system 700 of FIG. 7.

Computing environment 100 may also include one or more servers 110. By way of example, server(s) 110 may include any combination of one or more of web servers, mainframe computers, general-purpose computers, personal computers, or other types of computing devices.

In some embodiments, one or more of server(s) 110 may be configured to host a webpage, implement a search engine, provide an online bill pay center, provide online applications or forms, provide downloadable software (e.g., web browser extensions), index information, store information, and/or retrieve information. In some embodiments, a server 110 may be a standalone computing system or apparatus, or it may be part of a larger system. For example, server(s) 110 may represent distributed servers that are remotely located and communicate over a communications network, or over a dedicated network such as a local area network (LAN). Server(s) 110 may include one or more back-end servers for carrying out one or more aspects of the present disclosure.

Server(s) 110 may be implemented as a server system comprising a plurality of servers, or a server farm including a load balancing system and a plurality of servers. In some embodiments, a server 110 may be implemented with hardware devices and/or software applications running thereon. A server 110 may communicate with client devices, such as client device 130 over network(s) 150, and may also communicate with one or more databases 120 over one or more networks. For example, a server 110 may communicate by transmitting data to and/or receiving data from client devices and/or databases. In some embodiments, one or more of server(s) 110 may be implemented using a computer system, such as computer system 700 of FIG. 7.

In some embodiments, computing environment 100 may also include one or more databases 120. A database 120 may be a part of a server 110, or may be connected with a server 110 over one or more networks. Database(s) 120 may include any combination of one or more types of databases, such as hierarchical databases, network databases, relational databases, or object-oriented databases. A database 120 may store information related to an individual's financials or other information needed for filling out an application or form, such as a person's name, bank account number, account balance, mailing address, email address, telephone number, credit limit, salary information, debts, investments and/or any other type of information related to an applicant's financial history. This information may, for example, be stored as a profile or record associated with the person, and may include, for example, a username, unique file number, or other distinctive identifier. The profile or record may be stored in association with an application or form the person is attempting to complete, and may be updated to include information received from a client device associated with the person. A database may store a large collection of records associated with a number of persons. A database 120 may also store a large number of applications or forms. For example, a database 120 may store applications for car loans, mortgages, or credit cards. Alternatively, or additionally, a database 120 can store forms, such as tax forms. A database 120 may be searchable, such that a server 110 or client device can submit a query to the database to lookup records or information associated with banking customers. In response to such a query, a server 110 or client device may receive a list of one or more records or results that may match the submitted query. A database 120 may be implemented in software, or in a combination of software and hardware.

Database(s) 120 may be included within server(s) 110, or may be connected to server(s) 110 over one or more networks. A network may provide for the exchange of information, such as queries for information and results, between server(s) 110 and database(s) 120. A network may include one or more wide area networks (WANs), metropolitan area networks (MANs), local area networks (LANs), personal area networks (PANs), or any combination of these networks. A network may include a combination of one or more types of networks, such as Internet, intranet, Ethernet, twisted-pair, coaxial cable, fiber optic, cellular, satellite, IEEE 802.11, terrestrial, and/or other types of wired or wireless networks. A network may also be encrypted such as the hypertext transfer protocol secure (HTTPS) standard or other types of encrypted connections. In some embodiments, one or more of databases(s) 120 may be implemented using a computing system, such as computer system 700 of FIG. 7.

In some embodiments, computing environment 100 may also include one or more networks 150. Network(s) 150 may connect server(s) 110 with client devices, such as client device 130. Network(s) 150 may provide for the exchange of information, such as queries for information and results, between client devices and servers 110. Network(s) 150 may include one or more types of networks interconnecting client devices 130 with server(s) 110.

Network(s) 150 may include one or more wide area networks (WANs), metropolitan area networks (MANs), local area networks (LANs), personal area networks (PANs), or any combination of these networks. Network(s) 150 may include a combination of one or more types of networks, such as Internet, intranet, Ethernet, twisted-pair, coaxial cable, fiber optic, cellular, satellite, IEEE 802.11, terrestrial, and/or other types of wired or wireless networks.

The various components of the system 100 may be connected as shown in FIG. 1 or in any other suitable manner. The system components may be connected by one or more wireless or wireline computer networks.

Figure 2:
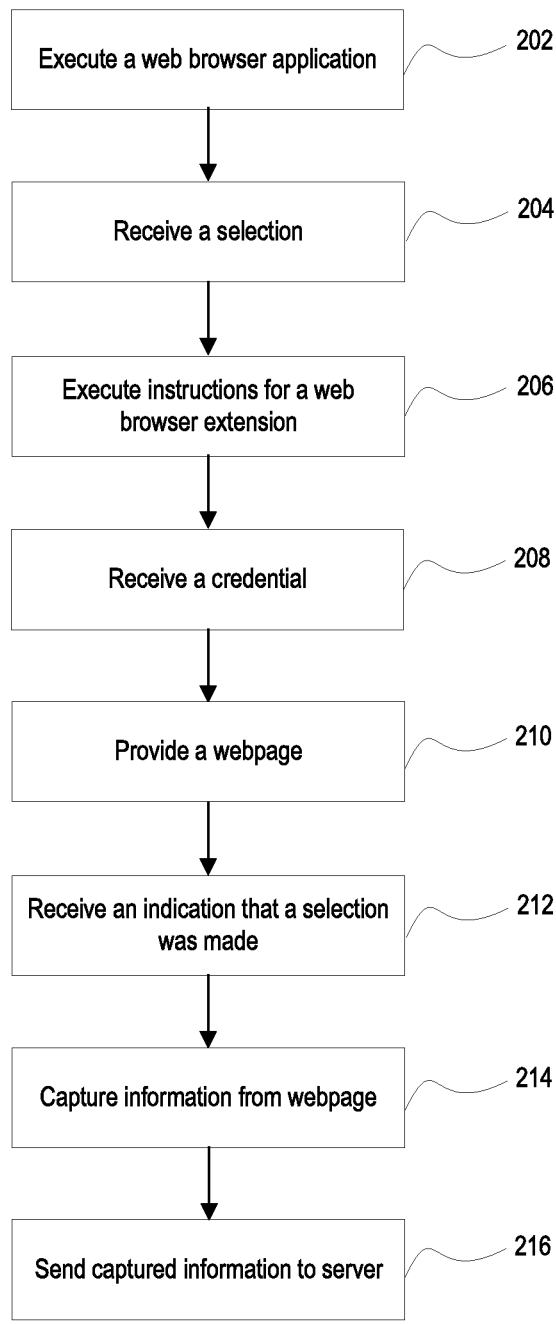
FIG. 2 illustrates a flowchart of an example method for capturing information, consistent with embodiments of the present disclosure.

FIG. 2 illustrates a flowchart of an example method 200 for capturing information, consistent with embodiments of the present disclosure. Example method 200 may be implemented in a computing environment (see, e.g., FIG. 1) using one or more computer systems (see, e.g., FIG. 7). In some embodiments method 200 may be performed by a client device 130.

In some embodiments, a user may use a client device (e.g., client device 130) to access information about the user's financial documents from server(s) 110 over network(s) 150. For example, a user can use a client device to access their bank's website through a web browser that provides information about the user's checking account. Alternatively, a user can access information about the user's checking account using a software application installed on a client device. The user can also access a variety of different websites provided by different financial institutions such as credit unions, financial planners, tax preparation companies, payroll organizations, or other companies with information regarding a user's financial history. A website may present user interface screens to the user, such that the user can select various options relating to the user's account. Before being granted permission to view the checking account information, a user may be required to submit access credentials. For example, a user may be required to submit a username and password. Once the correct access credentials have been submitted, server(s) 110 may provide the client device with information relating to the user's account, such as documents the user needs to complete a loan application.

A user may also use a client device (e.g., client device 130) to complete an online application or form provided by server(s) 110 over network(s) 150. For example, a user may wish to apply for a mortgage, or fill out a tax form. The user may use a client device 130 to access a website associated with a bank to start completing a loan application, or to access a website associated with a tax preparer to start filling out a tax form. Using client device 130, a user may enter information on user interface screens provided by the website to complete the application or tax form. A user may also upload documents (e.g., a pay stub) confirming that the information entered by the user is accurate.

In some embodiments, when the user indicates a desire to complete an application or form on a website, the website may provide the user with an option to download a web browser extension for the web browser application running on the user's client device. The web browser extension may be a small software module that customizes or supplements the capabilities of the web browser application. A web browser extension may provide capabilities related to how the web browser application interacts with and presents webpages and links. In some embodiments, a web browser extension can include two or more instances of software code, such as Javascript code, running in tandem. A first instance of the software code may run in the background, such as across all tabs and all frames and all pages in the web browser application, and may capture and communicate data involving any or all of the webpages being rendered by the web browser. A second instance of the software code may run concurrently with the first instance of the software code and can be inserted or injected into individual frames of a webpage being rendered by the web browser, such as primary frames or inline frames ("i-frames"), as they are rendered by the web browser. In some embodiments, messages may be passed between the first and second instances of the software code, such that the first instance of the software code running in the background may become aware of data being rendered in the individual frames of a web page.

If installed, the web browser extension may be used to assist the user in capturing documents and information needed to complete the application or form, and/or to assist the user in securely transferring information to server(s) 110 for use in completing the application or form. For example, if installed, the web browser extension may cause a selectable icon or button to appear in the web browser. The web browser extension may include functionality such that, when the user clicks the button while viewing a webpage, the webpage information (e.g., HTML, text, images) and URL of the webpage is captured by the web browser extension and securely transmitted from the client device running the browser extension to server(s) 110 over network(s) 150. Although use of web browser extensions are discussed herein, one of skill in the art would recognize that alternative software modules, such as web browser plug-ins, can be used for implementing the subject matter disclosed herein.

In step 202, a web browser application may be executed on a client device (e.g., client device 130). The web browser application may be executed, for example, in response to a user selection to open or execute the web browser application. The web browser application may have been pre-installed as part of a software package on the client device when the user purchased the client device. Alternatively, the web browser application may be installed on the client device by the user by downloading the web browser application from a source over the Internet or by installing the web browser application from a physical medium.

In some embodiments, once the web browser application has been opened and is executing on the client device, a user may navigate to a webpage. For example, a user may use the web browser application on the client device to navigate to a website associated with a bank, tax preparer, or other institution. The user may be interested in completing an application on the website associated with the institution, such as a loan application. Alternatively, the user may be interested in completing a form on the website associated with the institution, such as a tax form. The website may provide an option to download a web browser extension to assist in completing the application or form. Alternatively, the website may indicate that a particular third-party web browser extension may be used to assist in completing the application or form, if already downloaded by the client device.

In step 204, the user may select the option to download or use the web browser extension. If the user selected to download the web browser extension, the web browser application may open a webpage from which the user can download the web browser extension, or may otherwise begin transmission of the web browser extension to the client device. If the web browser extension was already installed by the user by downloading the web browser extension from a source over the Internet or from a physical medium, the web browser extension may open, if it were not already open, in response to the user selection. The web browser extension may be executed with the web browser application to enhance or modify the functionality of the web browser application.

In step 206, instructions for the web browser extension may be executed. For example, once the web browser extension has been downloaded or otherwise installed on the client device, the software code for the web browser extension may be executed. Execution of the web browser extension software code may automatically occur, for example, whenever the web browser application is opened or executed on the client device. Alternatively, a user may have to instruct the web browser extension to execute when the web browser application is executing by, for example, selecting an icon or button in the web browser application to execute the web browser extension. In some embodiments, the web browser extension may be executed in response to receiving the selection in step 204.

In step 208, a credential may be received. The credential may be received by the client device in response to the credential having been entered by a user. Alternatively, the credential may have been received from server(s) 110 in association with the selection in step 204 to download or otherwise use the web browser extension to assist in completing an application or form. The credential may be sent by the client device to server(s) 110 to associate captured information transmitted from the client device with a profile or record associated with the user using the client device. For example, the credential may be used to associate information transmitted from the client device in association with completing an application or form with the user and the application or form the user is completing. Server(s) 110 and/or database(s) 120 may store a profile or record for the user in association with the credential, so that the profile or record may be updated to include information received from the client device for completing the user's application or form. The credential may be, for example, one or more of a username, password, or reference identifier.

In some embodiments, the browser extension may request the user to input the credential. In some embodiments, the credential may have been created by the user upon selection to download or open the web browser extension. In other embodiments, the credential may have been created earlier when the user opened an account with the institution, or when the user selected to complete an application or form associated with the institution. The received credential may be sent to the server and verified against database records. This verification step may associate the client device on which the web browser extension is installed with the user's personal account, application, and/or form at the institution. User verification may require additional information such as user-selected security questions.

In some embodiments, the user may not have created a credential, which may cause the web browser extension to prompt the user to create one. If the user chooses not to create one, the web browser extension or server(s) 110 may assign a reference identifier to the user to associate any captured information with the application or form the user is completing. Alternatively, the web browser extension or server(s) 110 may automatically assign a reference identifier to the user to associate any captured information with the application or form the user is completing, without prompting the user to create a credential.

In step 210, a webpage may be provided. For example, the user may navigate to a webpage that has information needed to complete the application or form, and the web browser application on the client device may provide the webpage for viewing to the user. For example, if a user is trying to complete a loan application with an institution (e.g., Bank 1), the user may navigate to a webpage associated with another institution (e.g., Bank 2) with which the user has a savings account. The user may navigate to a website associated with Bank 2 and login to see his/her account information. For example, upon logging in, the user may be able to view a webpage showing his/her savings account balance. The user may also be able to retrieve statements, bank forms, or other information that may be useful in completing the loan application. The user may similarly use the web browser application to navigate webpages associated with income, investments, assets, liabilities, credit scores, tax information (e.g., W-2 forms), loan statements, investment fund statements, or any other information that may be helpful in completing an application or form. In some embodiments, rather than providing a webpage, the web browser application may render a document or image file, such as a portable document format (PDF) file containing the information the user needs to complete the application or form.

In step 212, an indication that a selection was made may be received. For example, when the web browser application is rendering a webpage or other document that includes the information the user needs to complete the form, the user may select an indicator (see, e.g., indicator 415 of FIGS. 4 and 5), such as an icon or button, associated with the web browser extension to capture the information on the webpage or document. The client device executing the web browser application and web browser extension may receive an indication that selection of the indicator was made by the user.

In step 214, the information displayed in the webpage or document may be captured. For example, in response to the indication that a selection was made in step 212, the web browser extension may cause files associated with the webpage, such as the HTML, images, cascading style sheets (CSS), and/or any files or data associated with the webpage, to be captured and stored in the client device. The browser extension may also cause the URL of the webpage to be captured and stored in the client device. In some embodiments, the web browser extension may cause a screenshot to be taken of the webpage or other document rendered by the web browser application. For example, if the web browser is rendering a PDF file, a screen shot of that file may be saved in the client computer. Alternatively, the document file itself may be saved in the client computer.

In some embodiments, the user may also indicate how the webpage or document being captured is relevant to the application or form the user is completing. For example, the user may select an option (e.g., "savings account balance") from a drop-down menu when capturing a webpage or document, or may enter text to indicate the relevance of the captured information.

In step 216, the captured information can be transmitted to server(s) 110 over network(s) 150. For example, the files associated with the captured webpage or captured document may be transmitted to server(s) 110, along with any information identifying the captured webpage or document. The information identifying the captured webpage may include, for example, the URL of the captured webpage. The information identifying the captured document may include, for example, the file name of the captured document. The information identifying the captured webpage or document may further include any information entered by the user indicating the relevance of the captured webpage or document, such as information entered by the user via a drop-down menu or text entry. In some embodiments, the credential may be transmitted to server(s) 110 along with the transmitted information. The credential may then be used by server(s) 110 to associate the captured information and/or information identifying the captured information with a record or profile associated with the user, so that the information may be associated with an application or form the user is completing.

In some embodiments, the captured information, information identifying the captured information, and/or the credential may be transmitted to server(s) 110 every time information is captured. Alternatively, the captured information, information identifying the captured information, and/or the credential may be transmitted to server(s) 110 in batches. For example, web browser extension may wait a period of time before making the transmission, and may transmit all of the information captured by the web browser extension during that period of time when the period of time expires. Alternatively, web browser extension may wait until a certain amount of information has been captured, and transmit the captured information as a batch transmission when that amount has been captured. In some embodiments, the captured information may be not be transmitted to server(s) 110 until the user expressly instructs the web browser extension to transmit the captured information. For example, the user may capture information from multiple webpages and/or documents and then select a button or icon in the web browser application associated with the web browser extension to transmit the captured information.

In some embodiments, prior to transmitting information captured from a webpage to server(s) 110, the web browser extension may confirm that the webpage is an authentic webpage. The web browser extension may do so, for example, by extracting a certificate, such as a secure sockets layer (SSL) certificate or transport layer security (TLS) certificate, from the webpage. The web browser extension may then transmit the certificate to servers associated with a trusted third party, such as Verisign or Symantec, whose servers may compare the certificate with a key stored at those servers. If the certificate matches the stored key, the trusted third party may indicate to the web browser extension that the webpage is authentic. If the certificate does not match the stored key, the trusted third party may indicate to the web browser extension that the webpage is not authentic or is not to be trusted. The web browser extension may then transmit an indication of whether the webpage is authentic or not to server(s) 110 along with transmission of the captured information. Alternatively, the web browser extension may deny transmission of the captured information to server(s) 110 if the webpage is not determined to be authentic, and may present a warning to the user that transmission of the captured information has failed.

In some embodiments, the captured information may be transmitted from the web browser extension to server(s) 110 over network(s) 150 using an encrypted connection, such as a HTTPS connection. The encrypted connection may prevent the captured information from being intercepted by a third party, and may provide assurance to the institution and the user that the data is not intercepted, modified, or otherwise altered during transmission between the client device and server(s) 110.

After step 216, the captured information received by server(s) 110 may be associated with the user and/or the application or form the user is in the process of completing. For example, server(s) 110 may receive the captured information and associate it with a profile or record for the user, such that the information is accessible to the user when the user logs into the institution to view the status of the application or form. In some embodiments, server(s) 110, upon receiving the captured information, may extract information pertinent to the form or application from the captured information. For example, if the captured webpage was a webpage listing bank account information for the user, including a list of transactions and an account balance, server(s) 110 may extract only the account balance information for association with a loan application. Server(s) 110 may identify the account balance information by searching for particular indicators, such as keywords or tags in HTML, representative of the relevant information. If the captured information corresponds to an image file, server(s) 110 may perform optical character recognition (OCR) on the image file to convert the file to text, and then search the text for indicators, such as keywords, representative of the relevant information. If the filename or URL corresponding to captured information corresponds to a filename or URL with which the institution is familiar, pre-defined rule sets may be used to identify the pertinent information. For example, if the URL is a URL of a well-known bank, pre-defined rules may be stored on server(s) 110 to search for particular indicators the institution knows to exist in the webpages or documents associated with that bank.

In some embodiments, steps 210-216 may be repeated for different webpages and/or documents until all of the information needed to complete an application or form has been captured. For example, a user may first visit a website of a bank that services his/her savings account, and may capture a webpage displaying his/her account balance. The user may then visit a website that provides credit score services, and capture a webpage displaying the user's credit score. The user may continue to visit webpages and/or documents, and to capture these webpages and/or documents, until the user has captured the information he/she needs to complete the application or form.

Figure 3:
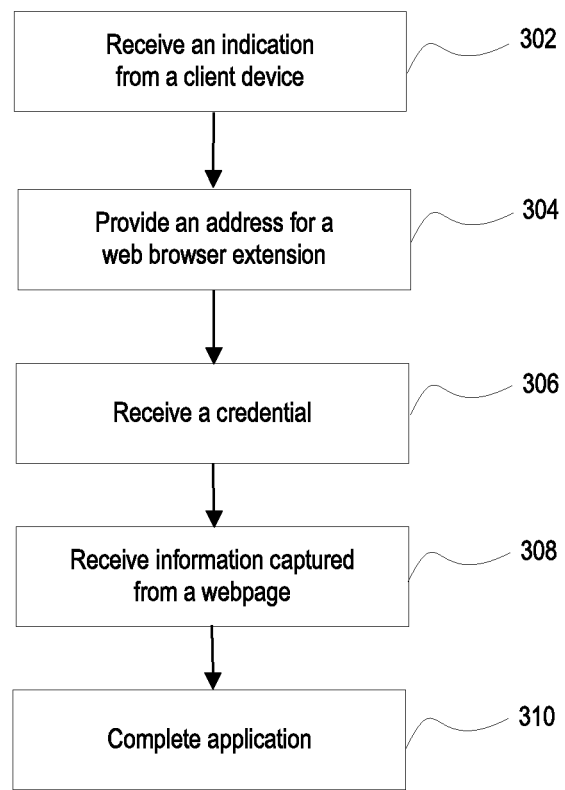
FIG. 3 illustrates a flowchart of an example method for receiving captured information, consistent with embodiments of the present disclosure.

FIG. 3 illustrates a flowchart of an example method 300 for capturing information, consistent with embodiments of the present disclosure. Example method 300 may be implemented in a computing environment (see, e.g., FIG. 1) using one or more computer systems (see, e.g., FIG. 7). In some embodiments, method 300 may be performed by one or more servers 110.

In step 302, an indication from a client device may be received. For example, server(s) 110 may receive an indication in response to a user selection on the client device that a user wishes to complete an application or form, or wishes to download a web browser extension. The indication may be received after the user selects an indicator, such as a button or icon, in a web browser application indicating that he/she wishes to complete an application or form, or to download a web browser extension.

In step 304, an address for a web browser extension may be provided. For example, in response to receiving the indication in step 302, server(s) 110 in step 304 may transmit a URL to the client device, such that the web browser application on the client device can use the URL to download the web browser extension. The client device may then download the web browser extension from a server, such as one of server(s) 110, and install the web browser extension for use with the web browser application.

In step 306, a credential may be received. For example, server(s) 110 may receive a credential from the client device after the client device has installed the web browser extension. The credential may be, for example, a username, password, and/or reference identifier for identifying the user, or the application or form the user is completing. For example, the credential may be used to identify a record associated with the user or a profile associated with the user, such that information captured by the web browser extension can be stored in association with the user, or in association with the application or form the user is in the process of completing.

In step 308, captured information may be received. For example, server(s) 110 may receive information captured by the web browser extension on the client device, for use in completing an application or form the user is in the process of completing. The captured information may be information captured from a webpage that was rendered in the web browser application on the client device, or from a document (e.g., a PDF file) that was rendered in the web browser application on the client device. In addition to receiving the captured information, server(s) 110 may receive information associated with the captured information, such as a URL of the webpage that was captured, a filename of the document that was captured, the credential, and/or any other information the user entered to indicate the relevance of the captured information.

In step 310, an application or form may be completed. For example, server(s) 110 may use the captured information to complete at least a portion of an application or form. Server(s) 110 may store and execute software with rules or algorithms for parsing through the captured information to identify information relevant to the application or form the user is in the process of completing. In some embodiments, the software stored and executed on server(s) 110 may identify certain known fields in captured information associated with webpages or documents of known institutions. For example, if the web browser extension had captured information from a website associated with a bank known to the institution, as identified by matching the URL of the website with a list of URLs associated with known banks stored in database(s) 120, the institution with whom the user is completing the form or application may know which fields that bank uses for presenting certain types of information, and may have programmed rules into the software to identify these fields. If a well-known bank, for example, is known to list a savings account balance next to a keyword "balance," the rules and algorithms implemented in the software on server(s) 110 may parse the HTML of information captured from a webpage to identify this keyword and to extract the account balance from the field next to this keyword. The rules and algorithms in the software application executed on server(s) 110 may be configured to identify certain keywords, tags, attributes, and/or other elements within captured HTML to identify information relevant to completing a form or application. In some embodiments, the rules and algorithms in the software application executed on server(s) 110 may be configured with XPaths, which can be used to navigate the captured HTML to identify information relevant to completing a form or application. If the captured information were an image document, such as a screenshot, the rules and algorithms implemented in the software on server(s) 110 may perform OCR on the image to obtain text, may then parse this text to identify the keyword, and may extract the account balance from the field next to the keyword.

In some embodiments, the rules and algorithms in the software application executed by server(s) 110 may determine that the information was captured from a webpage or document that is not associated with a known institution. For example, a document may have been captured from a small business's online payroll system. Upon determining that the URL or filename associated with captured information does not correspond to a known institution, the rules and algorithms in the software application executed on server(s) 110 may use generic rules for identifying likely relevant information. For example, the generic rules may be used to parse the captured information for keywords such as "balance," "sum," "credit score," "assets," "liabilities," "due," or "income." The generic rules may also be configured to identify certain elements that may be indicative of relevant information, such as text larger than a certain font size, graphics, font, weight (e.g., bold), italicized text, or any other feature that sets certain text apart from other text in a document.

In some embodiments, a machine learning and/or a neural network model may be used to identify likely relevant information for completing an application or form. For example, a model may be trained using keywords, phrases, fields, graphics, or portions of code that have previously been identified as including information relevant to completing an application or form. In some embodiments, the model may consult a dictionary of terms previously identified as being relevant, along with lists of synonym terms and related concept terms, in determining which words or phrases are likely to include relevant information. In some embodiments, the model may suggest portions of captured information as likely to contain relevant information to a person, and the person, such as an administrator or a user of the client device, may confirm whether or not the information is relevant. Feedback from the administrator or user may then be used to refine the model, by weighting certain terms, phrases, or graphics as being more or less likely to contain relevant information than other terms, phrases, or graphics based on the feedback received from the administrator or user. In some embodiments, a user or administrator may be given the opportunity to manually update the model by selecting to include a term, phrase, or graphic known to contain relevant information. Training of the model may be continuous over time, or may be performed over only an initial period of time. Once the model has been trained with at least an initial set of data, the model may then be used to automatically identify from captured information relevant information, or potentially relevant information, for completing an application or form.

In some embodiments, server(s) 110 may identify parsed information as being relevant to an application or form by comparing the parsed information to information stored in database(s) 120 in association with the application or form. For example, information captured from a webpage, such as HTML information, may be parsed to identify one or more tags and attributes associated with the one or more tags. Server(s) 110 may then compare the tags with a list of tags stored in database(s) 120 in association with the application or form. Server(s) 110 may then identify tags and associated attributes as being relevant to the application or form based on the comparison. For example, if a tag parsed from the HTML matches a tag stored in a database in association with the application or form, the tag and its corresponding attribute may be identified as relevant to the application or form. For example, if certain tags are known to exist on certain webpages of well-known institutions, database(s) 120 may store those tags in a list of tags associated with a URL of the institution. When server(s) 110 receive information captured from a webpage from a client device along with a URL of the webpage, server(s) 110 may retrieve the list of stored tags based on the URL, and then compare the stored tags with tags parsed from the captured information to identify information relevant to the application or form.

In some embodiments, if the software on server(s) 110 is unable to identify the information relevant to an application or form by automatically parsing the captured information, the captured information may be rendered to a person, who can manually identify the information and include it in the application or form. For example, information captured from a webpage, such as an HTML file, image files, and a CSS file, may be used to render a webpage for a person so that the person can manually identify the relevant information and input the information into the application or form.

The information relevant to the application or form, whether automatically or manually parsed from the captured information, may be input into fields of the application or form until at least a portion of the application or form is complete. In some embodiments, steps 308-310 may be repeated for different webpages and/or documents until all of the information needed to complete an application or form has been captured. For example, a user may first visit a website of a bank that services his/her savings account, and may capture a webpage displaying his/her account balance. The user may then visit a website that provides credit score services, and capture a webpage displaying the user's credit score. The user may continue to visit webpages and/or documents, and to capture these webpages and/or documents, until the user has captured the information he/she needs to complete the application or form. Server(s) 110 may parse the captured information as it is received from the client device, or may wait until the user transmits an indication to server(s) 110 indicating that he/she has finished capturing information.

If any fields remain to be completed in the application or form, server(s) 110 may instruct the user to manually complete the remaining fields. Once the application or form is complete, the application or form may be submitted for approval with the institution.

Once the application or form has been completed, server(s) 110 may transmit a message to the client device over network(s) 150 indicating that the application has been completed. For example, the message may indicate that the online loan application has been completed in response to receipt of the captured information from the web browser extension.

Figure 4:
FIG. 4 illustrates an example view of a web browser displaying a web page and an indicator for a web browser extension for capturing information, consistent with embodiments of the present disclosure.

FIG. 4 illustrates an example view 400 of a web browser application 425 displaying a web page 430 and an indicator 415 for a web browser extension for capturing information from the webpage. In this example, the webpage is a webpage associated with a bank of the user. The address 410 of the webpage displaying the user's bank account information is shown as https://www.examplebank.com in this example. The webpage in this example displays information 440 associated with the user's bank account, such as the name of the account holder, the account number of the account, the routing number of the account, the type of the account, and the current balance of the account. Consistent with embodiments of the present disclosure, the user may select indicator 415, which can be a selectable button or icon in the web browser application, to cause the web browser extension to capture information from the webpage. For example, selection of indicator 415 may cause the web browser extension to store the HTML file of the webpage, and to transmit that HTML, along with the URL and a credential, to server(s) 110. Alternatively, selection of indicator 415 may cause the web browser extension to capture a screenshot of the webpage, and to transmit that screenshot, along with a credential, to server(s) 110. Once server(s) 110 have received the captured information, the captured information may be parsed to identify information relevant to the application or form the user is in the process of completing. For example, if the user is completing a loan application, server(s) 110 may extract the balance amount of $52,621.54 for use in completing a field of the loan application corresponding to the user's savings or assets.

Figure 5:
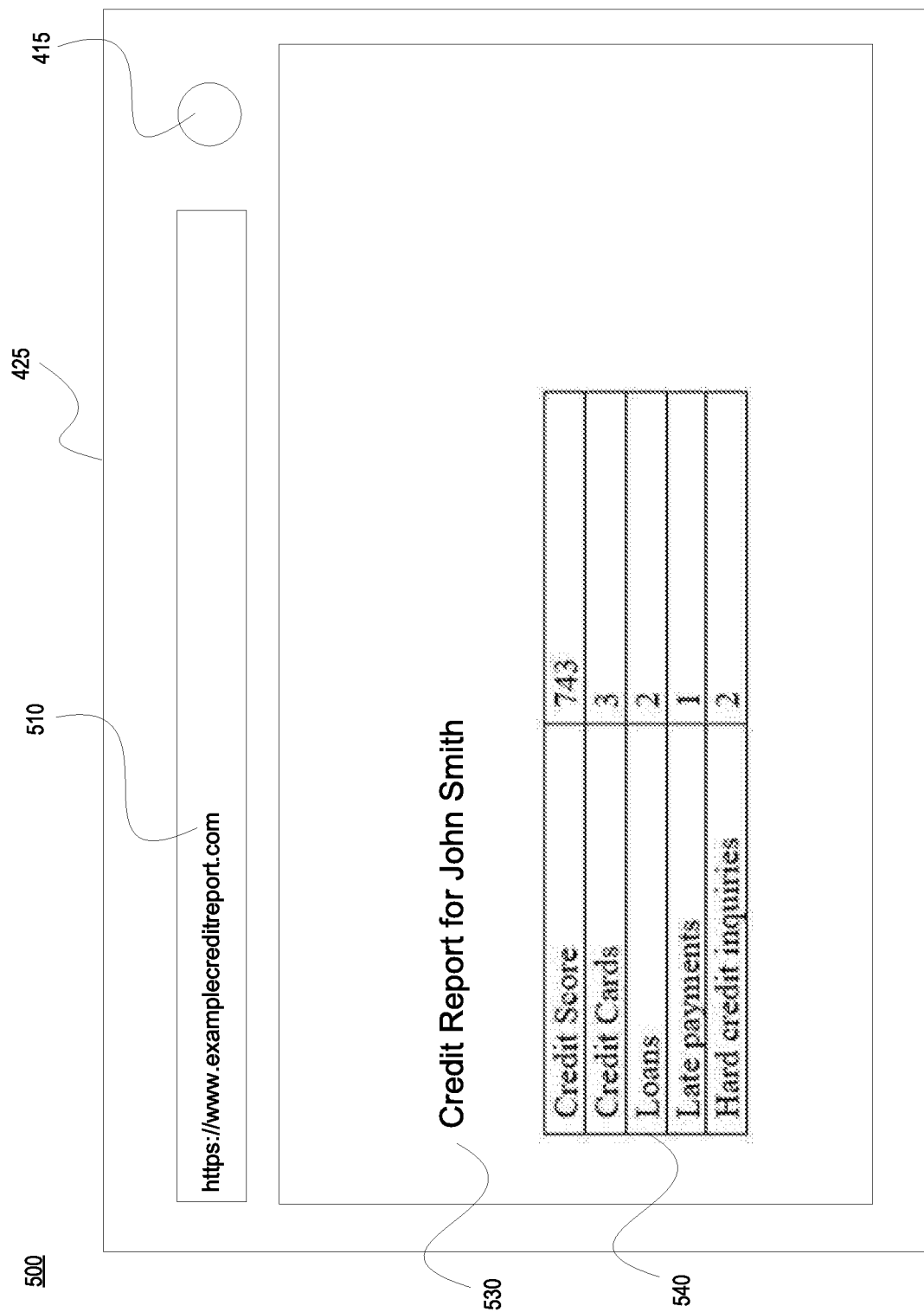
FIG. 5 illustrates an example view of a web browser displaying another web page and an indicator for a web browser extension for capturing information, consistent with embodiments of the present disclosure.

FIG. 5 illustrates an example view 500 of a web browser application 425 displaying a web page 530 and an indicator 415 for a web browser extension for capturing information from the webpage. In this example, after capturing information from web page 430 (see, e.g., FIG. 4), the user has navigated to a webpage 530 associated with his/her credit report to capture additional information relevant to the loan application. The address 510 of the webpage displaying the user's credit information is shown as https://www.examplecreditreport.com in this example. The webpage in this example displays information 540 associated with the user's credit, such as the user's credit score, the number of credit cards the user has open, the number of loans the user has open, the number of payments the user has made late, and the number of hard inquiries into the user's credit. Consistent with embodiments of the present disclosure, the user may select indicator 415, which may be a selectable button or icon in the web browser application, to cause the web browser extension to capture information from the webpage. For example, selection of indicator 415 may cause the web browser extension to store an HTML file of the webpage, and to transmit that HTML file, along with the URL and a credential, to server(s) 110. Alternatively, selection of indicator 415 may cause the web browser extension to capture a screenshot of the webpage, and to transmit that screenshot, along with a credential, to server(s) 110. Once server(s) 110 have received the captured information, the captured information may be parsed to identify information relevant to the application or form the user is in the process of completing. For example, if the user is completing a loan application, server(s) 110 may extract the credit score of 743, the number of open credit cards (i.e., 3), the number of open loans (i.e., 2), and the number of late payments (i.e., 1) for use in completing fields of the loan application corresponding to the user's credit risk.

FIG. 6 illustrates an example view 600 of an application to be completed at least in part with captured information. The application may be, for example, a loan application. The information captured by the web browser extension may be used by server(s) 110 to populate fields 610 of the loan application. In this example, the credit score, credit cards, and loans fields may be filled, for example, by information parsed from the information captured from webpage 530 (see FIG. 5). In this example, the checking account balance field may be filled, for example, by information parsed from the information captured from webpage 430 (see FIG. 4). The user may navigate to additional webpages or documents using the web browser application to capture information for completing the fields for savings account balance and investment balance.

Figure 7:
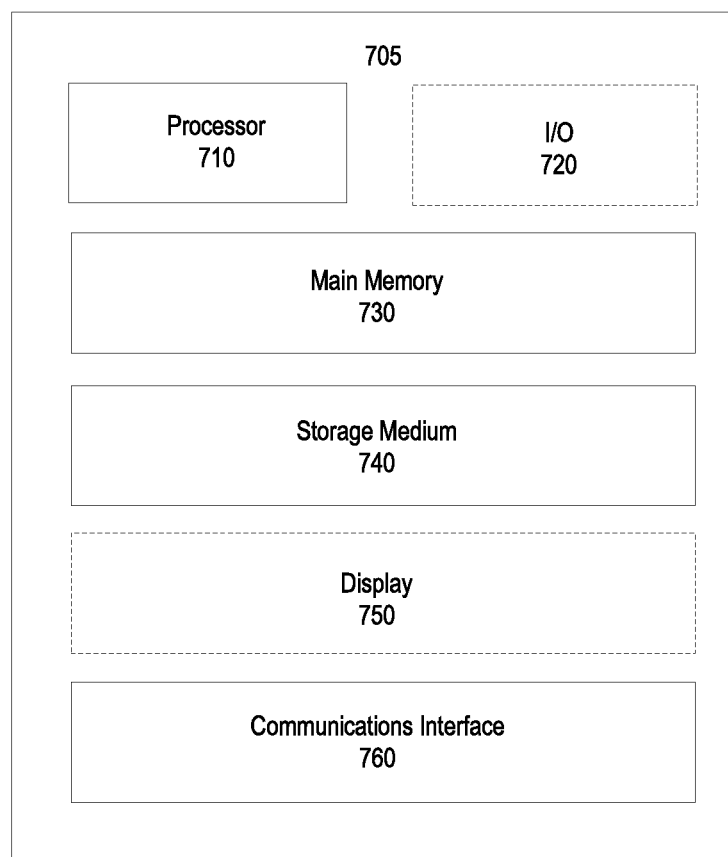
FIG. 7 illustrates an example computer system for implementing embodiments and features consistent with the present disclosure.

FIG. 7 illustrates an example computer system 700 for implementing embodiments and features consistent with the present disclosure. Computer system 700 may include one or more computing devices 705. A computing device may include one or more processors 710 for executing instructions. Processors suitable for the execution of instructions may include, by way of example, both general and special purpose microprocessors, and any one or more processors of any kind of digital computer. A computing device 705 may also include one or more input/output (I/O) devices 720. By way of example, I/O devices 720 may include keys, buttons, mice, joysticks, styluses, gesture sensors (e.g., video cameras), motion sensors (e.g., infrared sensors, ultrasound sensors), voice sensors (e.g., microphones), etc. Keys and/or buttons may be physical and/or virtual (e.g., provided on a touch screen interface).

A computing device 705 may include one or more storage devices configured to store data and/or software instructions used by processor(s) 710 to perform operations consistent with the disclosed embodiments. For example, a computing device 705 may include main memory 730 configured to store one or more software programs that, when executed by processor(s) 710, cause processor(s) 710 to perform functions or operations consistent with disclosed embodiments. By way of example, main memory 730 may include NOR or NAND flash memory devices, read only memory (ROM) devices, random access memory (RAM) devices, etc. A computing device 705 may also include one or more storage medium(s) 740. By way of example, storage medium(s) 740 may include hard drives, solid state drives, tape drives, redundant array of independent disks (RAID) arrays, etc. Although FIG. 7 illustrates only one main memory 730 and one storage medium 740, a computing device 705 may include any number of main memories 730 and storage mediums 740. Further, although FIG. 7 illustrates main memory 730 and storage medium 740 as part of computing device 705, main memory 730 and/or storage medium 740 may be located remotely and computing device 705 may be able to access main memory 730 and/or storage medium 740 via one or more network(s).

Storage medium(s) 740 may be configured to store data, and may store data received from one or more of server(s) 110, database(s) 120, or client devices (e.g., client device 130). The data may take or represent various content or information forms, such as documents, textual content, graphical content, and any other type of information and/or content in which a user may be interested, or any combination thereof. The data may further include other data received, stored, and/or inferred by computer system 700, such as user preference information and/or any other data used for carrying out embodiments of the present disclosure.

A computing device 705 may also include one or more displays (not shown). Display(s) may be implemented using one or more display panels, which may include, for example, one or more cathode ray tube (CRT) displays, liquid crystal displays (LCDs), plasma displays, light emitting diode (LED) displays, organic light emitting diode (OLED) displays, touch screen type displays, projector displays (e.g., images projected on a screen or surface, holographic images, etc.), field emission displays (FEDs), active matrix displays, vacuum fluorescent (VFR) displays, 3-dimensional (3-D) displays, electronic paper (e-ink) displays, microdisplays, or any combination of the above types of displays.

A computing device 705 may further include one or more communications interfaces 760. Communication interface(s) 760 may allow content, software, data, messages, and/or other information to be transferred between server(s) 110, database(s) 120, and client devices (e.g., client device 130). Examples of communication interface(s) 760 may include modems, network interface cards (e.g., an Ethernet card), communications ports, personal computer memory card international association (PCMCIA) slots and card, antennas, etc. Communication interface(s) 760 may transfer software, content, data, messages, or other information in the form of signals, which may be electronic, electromagnetic, optical, and/or other types of signals. The signals may be provided to/from communications interface 760 via a communication path (e.g., network(s) 150), which may be implemented using wired, wireless, cable, fiber optic, radio frequency (RF), and/or other communication channels.

A computing device 705 may have additional or fewer components depending on whether the computer system is a client device (e.g., client device 130), server 110, or database 120. For example, a server 110 and/or database 120 may not have input/output device(s) 720. A server 110 and/or client device 120 may also not have display(s) 750.

The subject matter disclosed herein can be implemented in digital electronic circuitry, or in computer software, firmware, or hardware, including the structural means disclosed in this specification and structural equivalents thereof, or in combination of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of computer programs include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, certain computers might also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices (e.g., EPROM, EEPROM, and flash memory devices), magnetic disks (e.g., internal hard disks or removable disks); magneto optical disks; and optical disks (e.g., CD and DVD disks). The processor and the memory can be supplemented by, or incorporated in, special purpose logic circuitry.

To provide for interaction with a user, some subject matter described herein can be implemented on a computer having a display device, e.g., a CRT (cathode ray tube) or LCD (liquid crystal display) monitor, for displaying information to the user, and a keyboard and a pointing device (e.g., a mouse, trackball, touchscreen), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Some subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or a combination of such back end, middleware, and front end components. The components of the system can be interconnected by any form of medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computer-implemented method for capturing webpage information, comprising:
    sending, by a client device including a processor, an indication from a web browser application executing on the client device to a server that a user desires to complete an online application;
    executing, by the client device, the web browser application and instructions for a web browser extension for the web browser application;
    receiving, by the client device, a credential for associating a user with a profile stored on a server;
    providing, by the client device, a webpage for display to the user using the web browser application;
    receiving, by the client device, an indication that the user has made a selection using the web browser extension while the webpage is displayed to the user;
    capturing, by the client device, at least one of a hypertext markup language (HTML) file or a cascading style sheet (CSS) file from the webpage based on the indication;
    sending, by the client device, the captured file to a server over a network for storage in association with the profile;
    sending, by the client device to the server over the network, a universal resource locator (URL) of the webpage from which the file was captured;
    receiving, by the client device over the network from the server, the online application completed with information extracted from the captured file by a rule or algorithm associated with the URL, the rule or algorithm being configured to identify at least one of a keyword, a tag, or an attribute from the captured file; and sending, by the client device to the server over the network, feedback associated with the extracted information, wherein the feedback is used to redefine or retrain the rule or algorithm.

2. The method of claim 1, wherein the webpage is a first webpage and the indication is a first indication, comprising:

providing, by the client device, a second webpage for display to the user using the web browser application;

receiving, by the client device, a second indication that the user has made a selection using the web browser extension while the second webpage is displayed to the user;

capturing, by the client device, at least one of an HTML file or a CSS file from the second webpage based on the second indication;

sending, by the client device, the captured file from the second webpage to the server over the network for storage in association with the profile.

3. The method of claim 1, comprising verifying that a secure sockets layer (SSL) certificate or a transport layer security (TLS) certificate for the webpage is valid.

4. The method of claim 1, comprising sending, by the client device, the captured file from the webpage to the server over the network in an encrypted form.

5. The method of claim 1, comprising:

receiving, by the client device, input from the user identifying a type of information provided on the webpage; and sending, by the client device over the network to the server, information regarding the type of the information provided on the webpage based on the user input.

6. A server system for capturing webpage information, comprising:

a memory storing instructions; and one or more processors that, when executing the instructions, are configured to:

receive, over a network, an indication from a web browser executing on a client device that a user desires to complete an online application;

provide, over the network to the client device, an address for downloading a web browser extension in response to the indication;

receive, over the network, a file captured from a webpage by the client device using the web browser extension;

receive, over the network from the client device, a uniform resource locator (URL) of the webpage;

identify at least one rule or algorithm associated with the URL for extracting information relevant to the online application from the captured file;

use the at least one rule or algorithm to identify at least one of a keyword, a tag, or an attribute from the captured file by at least one of parsing hypertext markup language (HTML) information of the captured file or performing optical character recognition (OCR) on the file;

extract information associated with the at least one identified keyword, tag, or attribute;

complete the online application based at least in part on the extracted information; and receive, over the network from the client device, feedback associated with the extracted information, wherein the feedback is used to redefine or retrain the at least one rule or algorithm.

7. The server system of claim 6, wherein the webpage is a first webpage, and the one or more processors are configured to:

receive, over the network, a file captured from a second webpage by the client device using the web browser extension;

extract information from the file captured from the second webpage by at least one of parsing HTML information of the file captured from the second webpage or performing OCR on the file captured from the second webpage; and complete the online application based at least in part on the extracted information from the file captured from the first webpage and the file captured from the second webpage.

8. The server system of claim 7, wherein the one or more processors are configured to store the extracted information from the file captured from the first webpage and the extracted information from the file captured from the second webpage in association with a profile for the user.

9. The server system of claim 6, wherein the captured file comprises a HTML file.

10. The server system of claim 9, wherein the one or more processors are configured to:

parse the captured file to identify one or more tags and attributes associated with the one or more tags;

compare the one or more tags with a list of stored tags; and identify one of the tags and its associated attributes as being relevant to the online application as a result of the comparison.

11. The server system of claim 10, wherein the identified tag and its associated attributes indicates one of an income, a bank account balance, credit information, an investment fund balance, or a loan balance associated with the user.

12. The server system of claim 6, wherein the webpage comprises one of a pay stub, a W-2 form, a bank statement, an investment fund statement, a credit statement, or a loan statement associated with the user.

13. A client device for capturing webpage information, comprising:

a memory storing instructions; and a processor that, when executing the instructions, is configured to:

execute a web browser application;

receive a selection indicating that a user desires to complete an online application;

execute instructions for a web browser extension for the web browser application in response to the received selection;

provide a webpage for display to the user using the web browser application;

receive an indication that the user has made a selection using the web browser extension while the webpage is displayed to the user;

capture at least one of a hypertext markup language (HTML) file or a cascading style sheet (CSS) file from the webpage based on the indication;

send the captured file to a server over a network for storage in association with a profile associated with the user for the online application;

send, to the server over the network, a universal resource locator (URL) of the webpage from which the file was captured;

receive, from the server over the network, the online application completed with information extracted from the captured file by a rule or algorithm associated with the URL, the rule or algorithm being configured to identify at least one of a keyword, a tag, or an attribute from the captured file; and send, to the server over the network, feedback associated with the extracted information, wherein the feedback is used to redefine or retrain the rule or algorithm.

14. The client device of claim 13, wherein the webpage is a first webpage and the indication is a first indication, and the processor is configured to:

provide a second webpage for display to the user using the web browser application;

receive a second indication that the user has made a selection using the web browser extension while the second webpage is displayed to the user;

capture at least one of an HTML file or a CSS file from the second webpage based on the second indication; and send the captured file from the second webpage over the network for storage in associated with the profile associated with the user.

15. The client device of claim 13, wherein the processor is configured to receive a message from the server over the network indicating that the online application has been completed in response to sending the captured file to the server.

16. The client device of claim 13, wherein the file captured from the webpage comprises an image file of a screen shot of at least a portion of the webpage.

* * * * *